United States Patent [19]

Weir et al.

[11] 4,071,692

[45] Jan. 31, 1978

[54] DATA TRANSMISSION SYSTEMS

[75] Inventors: Donald A. Weir, Goff's Oak; Eric S. Usher, Ware; George A. Howells, Bishops Stortford, all of England

[73] Assignee: International Standard Electric Corporation, New York, N.Y.

[21] Appl. No.: 730,876

[22] Filed: Oct. 8, 1976

[30] Foreign Application Priority Data

Oct. 23, 1975 United Kingdom ............ 43564/75

[51] Int. Cl.² ........................ H04L 15/00; H04B 1/04
[52] U.S. Cl. .................................... 178/68; 178/69.1; 325/38 A
[58] Field of Search ...................... 178/68, 69.1, 23 A; 340/146.1 AB; 325/38 A, 44

[56] References Cited

U.S. PATENT DOCUMENTS

| 3,303,424 | 2/1967 | Hopner et al. | 178/68 |
| 3,502,810 | 3/1970 | Aaron et al. | 178/68 |
| 3,713,025 | 1/1973 | McNair | 178/69.1 |
| 3,783,383 | 1/1974 | Forster et al. | 178/69.1 |

Primary Examiner—Thomas A. Robinson
Attorney, Agent, or Firm—John T. O'Halloran; Alfred C. Hill

[57] ABSTRACT

Intelligence is conveyed in a PCM bit stream form with alternate bits being inverted. Additional information is conveyed by violations of the alternate bit rule so that two successive bits have the same polarity. Prior to being coupled to the alternate mark inversion coder a pseudo-random bit stream is mixed by binary addition without carry to the intelligence bit stream to maintain low DC level in the transmitted mixed bit stream and to maintain bit transitions relatively high.

4 Claims, 5 Drawing Figures

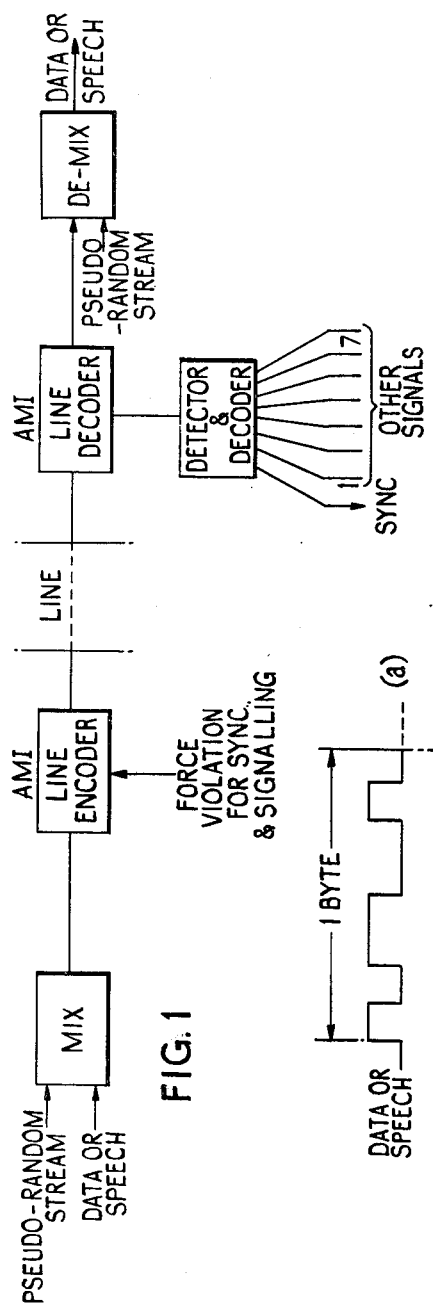
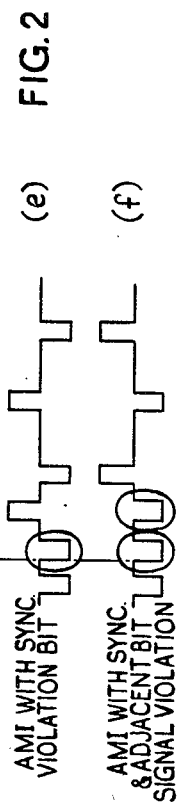
FIG.1
FIG.2

DATA TRANSMISSION SYSTEMS

BACKGROUND OF THE INVENTION

This invention relates to data transmission systems in which intelligence is conveyed in pulse code modulation (PCM) form, and especially to the use of such systems in automatic telecommunication exchange systems.

Balanced representation of a PCM bit stream is desirable to minimize the average DC (direct current) level on the line, but certain of the codes providing this facility, e.g. Alternate Mark Inversion (AMI), require line equalization. The economic penalty of this may be small for junctions, but it could be significant for subscriber circuits. However, advances in the techniques of automatic and adaptive equalization make the inclusion of such functions less objectionable. Where distances are relatively short the amount of equalization may be small or even reduced to reshaping the waveform. Hence, for PABX extensions and even for subscriber main exchange lines, such codes may be useful.

SUMMARY OF THE INVENTION

An object of this invention is to provide a data transmission system in which such codes are used and in which signalling capability is enhanced.

A feature of the present invention is the provision of a data transmission system in which intelligence is conveyed in a pulse code modulation (PCM) bit stream form with alternate bits of a first significance inverted comprising: first means to convey additional information to the intelligence by violations of a rule that alternate bits of the first significance are inverted, so that two successive bits of the first significance with the same polarity indicates the presence of the additional information; and second means coupled to the input of the first means to mix the bit stream with a pseudo-random bit stream prior to operation of the first means, the output signal of the first means being transmitted.

The mixing, which in the present case is analogous to the "computer-type" process of binary addition without carry, provides a signal in which low DC level is maintained, and also in which the number of transitions is relatively high. The latter feature is useful as it facilitates bit synchronization.

The application of the technique to PABX's and to subscribers's lines has been mentioned above. To meet the requirements thereof the systems should cater for both synchronization and signalling. Synchronization involves both bit and frame synchronization, which may be for single or multi-channel applications, and we herein assume that each channel is conveyed by an eight-bit byte.

Signalling in such systems may demand:

a. out-of-band signals to enable the transmission of a few signals while data or speech is being sent without affecting the information content. Such signals might be to advise a party on a key system that another call is waiting, to extend meter-operating signals, or to signal equipment monitoring information.

b. out-of-band flag signals to indicate the status of a byte. By using International Alphabet No. 5, a large signalling capacity is available, and such signalling could be transferred over a national digital network. In such cases the flag signal can be provided by a spare signal on channel 16 (assuming a 32 channel multiplexed signal), by separate channel signalling, or by the repeated transmission of a code in-band.

c. out-of-band or in-band signals to identify an initial signalling channel when using remote concentrators.

BRIEF DESCRIPTION OF THE DRAWING

Above-mentioned and other features and objects of this invention will become more apparent by reference to the following description taken in conjunction with the accompanying drawing, in which:

FIG. 1 is a simplified block schematic of a data transmission system in accordance with the principles of the present invention;

FIG. 2 shows pulse waveforms useful in explaining the operation of the system of FIG. 1;

DESCRIPTION OF THE PREFERRED EMBODIMENT

FIG. 2 shows one byte of intelligence as conveyed by the system, the original information being shown by Curve (a). To this the pseudo-random bit stream of Curve (b) is added modulo 2, to give the waveform of Curve (c). After alternate mark inversion there is obtained the result shown in Curve (d), which is a ternary representation of the data or speech represented by Curve (a). The block diagram, FIG. 1, illustrates how this process is achieved.

To provide frame synchronization, the output from the line encoder is violated by the frame synchronization signal, which reverses the polarity of the first binary "1" in the frame — see Curve (e) of FIG. 2. The subsequent "1"'s follow the usual alternating pattern, governed in each case only by the polarity of the immediately preceding bit, unless and until a further violation is introduced. Comparison of Curves (d) and (e) of FIG. 2 shows that a single violation of the first bit of the byte changes the polarity of subsequent "1"'s, but this is incidental to the process. The violation is detected at the receiver, when the line code is decoded to give an output, on the average every second frame to indicate that this is the frame synchronization position.

As the first bit in the frame is reserved for synchronization, the remaining seven bits of each byte can be used for out-of-band signalling. Further, the number of signals can be increased by using alternate frames to provide seven more signals, and thus build up the number of signals if desired. It is assumed herein that only seven out-of-band signals in addition to synchronization are needed.

Note that when a violation occurs polarity balance is disturbed, and if a single signal bit per byte causes violation this results in an unbalance of one in eight unit periods. To accommodate synchronization entails the violation of a bit per byte for a single channel system; to add a signalling capability one, but only one, of the other seven bits is also changed by the violation, giving an unbalance of two in eight unit periods throughout the period of signalling. This unbalance is temporary only, for the next violation might occur with opposite polarity depending only on the bit stream so that over a long period balance should be maintained.

The temporary unbalance condition is reduced in a multi-channel system as the synchronization signal occurs only once per frame, while the signals occur at random in the channels (except the initial signalling channel whose marking remains at a particular channel for as long as no further call is initiated). This only occurs in a multichannel system, but could use any channel resulting in a short term unbalance of a maximum of two in thirty-two.

It will be seen from FIG. 1 that the seven outputs of each channel can provide for seven different signals in addition to the synchronization signal.

It may be necessary to reserve one of these signals to indicate that a condition has ceased — to act as a step-on between signals.

Figure 3:
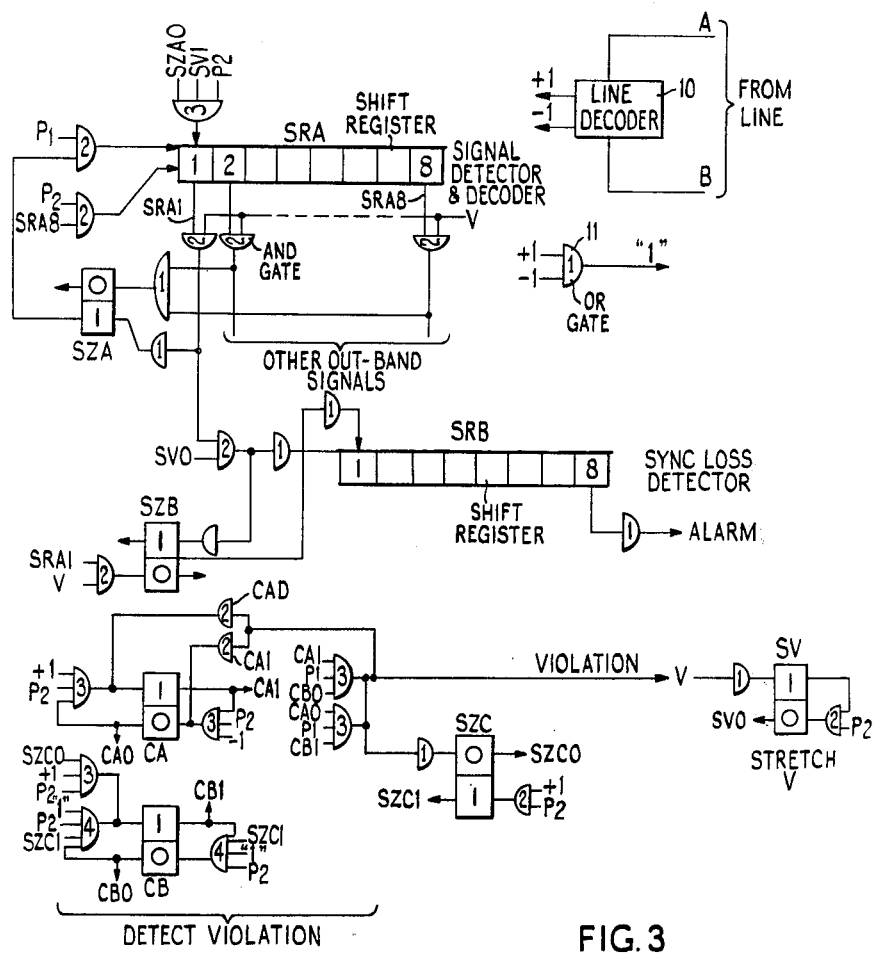
FIG. 3 is a logic circuit diagram of the detection arrangements used in the system of FIG. 1.
Figure 4:
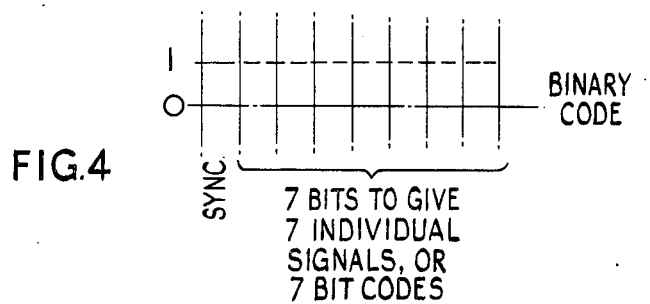
FIG. 4 is a diagram explanatory of the extraction of synchronization and signalling information from the detected violations in the detection arrangement of FIG. 3.

Synchronization and signalling detection is shown in some detail in FIG. 3. The line signals are received by the line decoder 10 which is conventional for PCM systems, and gives an output of +1 or −1 depending upon the polarity of the first line code bit. The two signals are mixed in OR gate 11 to give a "1" output. The +1 and −1 are used to drive a flip flop CA so that it changes state as the "1" signals alternate. The combined output "1" drives a binary counter or flip flop CB. As long as no violations occur the two counters or flip flops remain in step but as soon as violation takes place flip flop CA misses a step and gives an output V. This V output is stretched by the flip flop SV and so may be used at $P_2$ time although the violation output V occurs at $P_1$ time. $P_1$ and $P_2$ are "sub-time slots" which occur during each individual bit slot.

Each time the V output occurs, flip flop SZA is triggered to "0", except when the V output occurs when the SRA1 output of shift register SRA is present, and each time an output occurs from shift register SRA1, flip flop SZA triggers to "1" to permit shift register SRA to continue stepping. Thus, as long as synchronization is maintained, i.e. coincidence of output SRA1 and output V, the operation continues. Even if no coincidence occurs, as will be the case on the average half the time because the first bit may be "1" or "0", the cycle continues because flip flop SZA remains at "1". When there is no SRA1 output coincident with V, shift register SRB is stepped once as flip flop SZB triggers to "1", shifting marks into the SRB1 stage of shift register SRB and provides for further stepping of shift register SRB should lack of coincidence continue. Normally the coincidence of SRA1 output and V will occur in a few frames when flip flop SZB is restored to "0" and shift register SRB is reset. If no coincidence occurs for the eighth consecutive time, shift register SRB steps to eight and gives an alarm. Other out-of-band signals are obtained on the outlets 2 to 8 of shift register SRA.

FIG. 3 illustrates this in relation to a frame and it will be appreciated that these signals are per channel in the frame of 1, 4, 8, or 16 channels. It will also be appreciated that the significance attached to each of the seven signals can be determined as required.

The pseudo-random bit stream referred to above is derived from a scrambler as used on some modem systems. For instance, the British Post Office 48 kb/s modem uses such modulation for the same purpose on the leg from subscriber to group band modem. In the present case, where synchronous working is employed over the extensions, a common, duplicated, pseudo-random stream might be used at the PABX with the stream for the return channel provided by the incoming line signals before the modulo-2 operation.

An alternative system of signalling in which all signals are sent out-of-band may be considered. In this the out-of-band signals may form the equivalent of a start-stop 8 bit code of which the first bit is the channel synchronizing bit. When a "1" is detected in the first bit the violation indicates that this is the start bit; if the next "1" to appear in the second bit position of the channel is a "1" then the presence of the violation indicates a "1" in the signalling byte; if no violation then the signalling second bit is a zero. Similarly, if the third bit is a "1" it may again be either a "1" or "0" dependent upon the presence of a violation or not; and so on throughout the signalling byte to give, finally, a start + 7 bit code. It will be appreciated that the signalling bits do not need to be scanned sequentially, but if this is done a simple store of the received signalling code is achieved, each bit being examined in turn.

Figure 5:
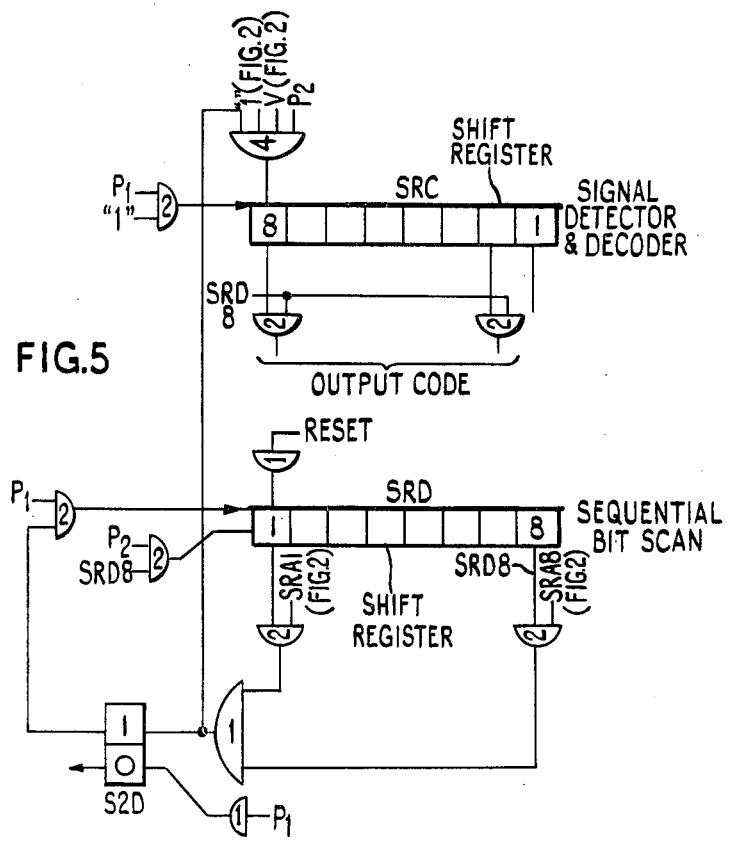
FIG. 5 is an out-of-band code detection system in accordance with the principles of the present invention.

The detailed operation of the scheme will be clear from a study of FIG. 5 in which the shift register SRC steps each time a "1" output is received on each of the 8 bits of a byte, depicted by the coincidence of the SRA1 of shift register SRA (FIG. 2) and the "1" position of shift register SRD. For each bit the presence of a violation V will insert a "1" in shift register SRC and will then indicate the code received when shift register SRD reaches position 8.

While we have described above the principles of our invention in connection with specific apparatus it is to be clearly understood that this description is made only by way of example and not as a limitation to the scope of our invention as set forth in the objects thereof and in the accompanying claims.

We claim:

1. A data transmission system in which intelligence is conveyed in a pulse code modulation (PCM) bit stream form with alternate bits of a first significance inverted comprising:
   first means to convey additional information to said intelligence by violations of a rule that alternate bits of said first significance are inverted, so that two successive bits of said first significance with the same polarity indicates the presence of said additional information;
   second means coupled to the input of said first means to mix said bit stream with a pseudo-random bit stream prior to operation of said first means, the output signal of said first means being transmitted;
   said second means mixing said bit stream and said pseudo-random bit stream by binary addition without carry;
   said first means providing synchronization information for transmission in said bit stream by violating the alternate inversion rule with respect to a first bit of each PCM bit combination at least once in each PCM frame, and signalling information being conveyed by violating the alternate inversion rule with respect to a bit of each PCM bit combination other than said first bit; and
   a line decoder coupled to the output of said first means to provide a first output signal when a bit of said first significance has a first polarity and a second output signal when a bit of said first significance has a second polarity;
   a first bistable means coupled to said line decoder changing its state on each bit of said first significance;

a second bistable means coupled to said line decoder changing its state as the polarity of the bits of said first significance alternates; and comparison means coupled to said first and second bistable means to compare the states of said first and second bistable means to provide an output signal when the states of said first and second bistable means are out of step, said output signal indicating that a violation of said rule has taken place.

2. A data transmission system in which intelligence is conveyed in a pulse code modulation (PCM) bit stream form with alternate bits of a first significance inverted comprising:

first means to convey additional information to said intelligence by violations of a rule that alternate bits of said first significance are inverted, so that two successive bits of said first significance with the same polarity indicates the presence of said additional information;

second means coupled to the input of said first means to mix said bit stream with a pseudo-random bit stream prior to operation of said first means, the output signal of said first means being transmitted;

said first means providing synchronization information for transmission in said bit stream by violating the alternate inversion rule with respect to a first bit of each PCM bit combination at least once in each PCM frame, and signalling information being conveyed by violating the alternate inversion rule with respect to a bit of each PCM bit combination other than said first bit; and a line decoder coupled to the output of said first means to provide a first output signal when a bit of said first significance has a first polarity and a second output signal when a bit of said first significance has a second polarity;

a first bistable means coupled to said line decoder changing its state on each bit of said first significance;

a second bistable means coupled to said line decoder changing its state as the polarity of the bits of said first significance alternates; and comparison means coupled to said first and second bistable means to compare the states of said first and second bistable means to provide an output signal when the states of said first and second bistable means are out of step, said output signal indicating that a violation of said rule has taken place.

3. A data transmission system in which intelligence is conveyed in a pulse code modulation (PCM) bit stream form with alternate bits of a first significance inverted comprising:

first means to convey additional information to said intelligence by violations of a rule that alternate bits of said first significance are inverted, so that two successive bits of said first significance with the same polarity indicates the presence of said additional information;

second means coupled to the input of said first means to mix said bit stream with a pseudo-random bit stream prior to operation of said first means, the output signal of said first means being transmitted;

said second means mixing said bit stream and said pseudo-random bit stream by binary addition without carry; and a line decoder coupled to the output of said first means to provide a first output signal when a bit of said first significance has a first polarity and a second output signal when a bit of said first significance has a second polarity;

a first bistable means coupled to said line decoder changing its state on each bit of said first significance;

a second bistable means coupled to said line decoder changing its state as the polarity of the bits of said first significance alternates; and comparison means coupled to said first and second bistable means to compare the states of said first and second bistable means to provide an output signal when the states of said first and second bistable means are out of step, said output signal indicating that a violation of said rule has taken place.

4. A data transmission system in which intelligence is conveyed in a pulse code modulation (PCM) bit stream form with alternate bits of a first significance inverted comprising:

first means to convey additional information to said intelligence by violations of a rule that alternate bits of said first significance are inverted, so that two successive bits of said first significance with the same polarity indicates the presence of said additional information;

second means coupled to the input of said first means to mix said bit stream with a pseudo-random bit stream prior to operation of said first means, the output signal of said first means being transmitted; and a line decoder coupled to the output of said first means to provide a first output signal when a bit of said first significance has a first polarity and a second output signal when a bit of said first significance has a second polarity;

a first bistable means coupled to said line decoder changing its state on each bit of said first significance;

a second bistable means coupled to said line decoder changing its state as the polarity of the bits of said first significance alternates; and comparison means coupled to said first and second bistable means to compare the states of said first and second bistable means to provide an output signal when the states of said first and second bistable means are out of step, said output signal indicating that a violation of said rule has taken place.

* * * * *